(12) United States Patent
Wu et al.

(10) Patent No.: US 11,030,169 B1
(45) Date of Patent: Jun. 8, 2021

(54) DATA RE-SHARDING

(71) Applicant: Amazon Technologies, Inc., Seattle, WA (US)

(72) Inventors: Ming-Chuan Wu, Bellevue, WA (US); Sandeep Bhatia, Bothell, WA (US); Andrew Whitaker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 314 days.

(21) Appl. No.: 15/452,587

(22) Filed: Mar. 7, 2017

(51) Int. Cl.
*G06F 16/22* (2019.01)
*G06F 16/2455* (2019.01)
*H04L 29/08* (2006.01)
*G06F 16/27* (2019.01)

(52) U.S. Cl.
CPC ........ *G06F 16/22* (2019.01); *G06F 16/24554* (2019.01); *G06F 16/278* (2019.01); *H04L 67/1031* (2013.01)

(58) Field of Classification Search
CPC .... G06F 9/5083; G06F 9/505; G06F 11/3433; G06F 11/3442; G06F 16/278; G06F 16/27; G06F 16/24554; G06F 16/22; G06F 3/0646; G06F 3/0647; G06F 3/0653; G06F 3/0655; G06F 11/2066; G06F 3/067; G06F 3/0644; H04L 67/1031; H04L 67/1097; H04L 67/10
See application file for complete search history.

(56) References Cited

U.S. PATENT DOCUMENTS

| 5,440,736 | A  | * | 8/1995  | Lawson, Jr. ............. G06F 7/36 |
| 5,625,818 | A  | * | 4/1997  | Zarmer ................. G06F 16/958 |
| 8,856,797 | B1 | * | 10/2014 | Siddiqui ................. G06F 11/34 718/104 |
| 9,411,862 | B1 | * | 8/2016  | Wang ................... G06F 16/2471 |
| 10,409,648 | B1 | * | 9/2019  | Bhatia .................... G06F 9/5027 |
| 2002/0176531 | A1 | * | 11/2002 | McClelland ............ B64F 1/368 378/57 |
| 2012/0109892 | A1 | * | 5/2012  | Novik ................... G06F 16/278 707/633 |
| 2012/0136835 | A1 | * | 5/2012  | Kosuru ............... G06F 11/2094 707/654 |

(Continued)

OTHER PUBLICATIONS

U.S. Appl. No. 15/447,014, filed Mar. 1, 2017, Bhatia et al.

(Continued)

*Primary Examiner* — David T. Brooks
(74) *Attorney, Agent, or Firm* — Robert C. Kowert; Kowert, Hood, Munyon, Rankin & Goetzel, P.C.

(57) ABSTRACT

Processing and storage responsibility for a data set may be split according to separately stored shards of the data set. As one or more loads associated with shards of the dataset grow a re-sharding operation may be performed to reduce loading of particular shards and nodes that host the particular shards. A re-sharding operation may cause only a sub-set of as set of shards of the dataset to be split and only cause second portions of the split shards to be stored in additional computing nodes. In some embodiments, a number of shards to be included in the sub-set of shards to be split may be selected based on an overall number of shards in the set and a largest number in the Fibonacci sequence that is less than the overall number of shards in the set.

20 Claims, 9 Drawing Sheets

(56) References Cited

U.S. PATENT DOCUMENTS

| | | | | |
|---|---|---|---|---|
| 2012/0254175 | A1* | 10/2012 | Horowitz | G06F 16/278 707/737 |
| 2012/0290714 | A1* | 11/2012 | Cohen | G06F 11/00 709/224 |
| 2012/0330954 | A1* | 12/2012 | Sivasubramanian | H04L 67/02 707/737 |
| 2013/0204990 | A1* | 8/2013 | Skjolsvold | G06F 9/45558 709/223 |
| 2013/0290249 | A1* | 10/2013 | Merriman | G06F 16/278 707/610 |
| 2014/0122510 | A1* | 5/2014 | Namkoong | G06F 16/27 707/755 |
| 2014/0330785 | A1* | 11/2014 | Isherwood | G06F 11/1446 707/640 |
| 2015/0095351 | A1* | 4/2015 | Balikov | G06F 16/24549 707/752 |
| 2015/0186187 | A1* | 7/2015 | Weisberg | G06F 16/278 707/747 |
| 2015/0378635 | A1* | 12/2015 | Skjolsvold | G06F 9/5061 711/114 |
| 2016/0011901 | A1* | 1/2016 | Hurwitz | G06F 9/4843 718/101 |
| 2016/0142475 | A1* | 5/2016 | Kathuria | H04L 67/1008 709/203 |
| 2016/0241577 | A1* | 8/2016 | Johnson | G06F 16/278 |
| 2017/0103116 | A1* | 4/2017 | Hu | G06F 16/213 |
| 2017/0118281 | A1* | 4/2017 | Lehmann | H04L 67/1095 |
| 2017/0177601 | A1* | 6/2017 | Borate | G06F 16/2228 |
| 2017/0353536 | A1* | 12/2017 | Shraer | H04L 43/08 |
| 2018/0121474 | A1* | 5/2018 | Lee | G06F 16/27 |

OTHER PUBLICATIONS

U.S. Appl. No. 14/077,173, filed Nov. 11, 2013, Theimer et al.
U.S. Appl. No. 14/077,167, filed Nov. 11, 2013, Theimer et al.
U.S. Appl. No. 14/875,194, filed Oct. 5, 2015, Gaurav D. Ghare.
U.S. Appl. No. 15/374,520, filed Dec. 9, 2016, Akhilesh Mritunjai.

\* cited by examiner

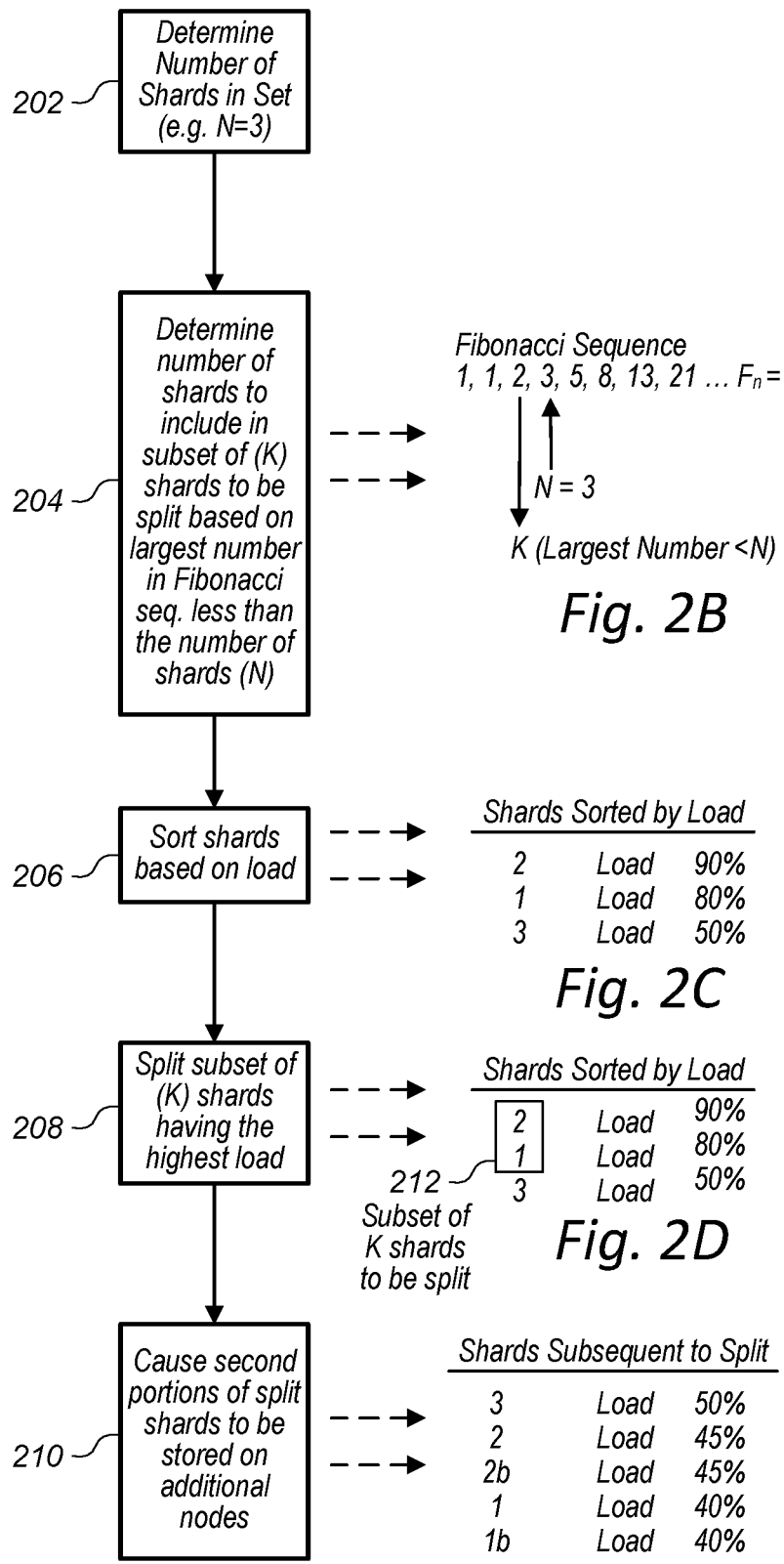

```
1   PROCEDURE ReSharding
2     INPUT PARAMETER:
3       vector<Shard>    shards      // the list of original shards
4   BEGIN
5     int N = shards.size();   //  current number of shards before split // set k to be the largest number in the Fibonacci sequence
      // that is less than N; in other words, k will be the number of
      // new shards
6     int k = PreviousFibonacci(N);

// sort the shards based on loads
7     SortByLoads (shards, DESCENDING);
8     for (int I = 0; I < k; i++)
9     {
10      EnqueueAsyncSplit (shards [ i ]);
11    }
12  END
```

Fig. 2F

DATA RE-SHARDING

BACKGROUND

In order to respond to changing conditions or workloads, various kinds of processing environments may rely upon scale out techniques to distribute work amongst multiple nodes. For example, as the demands upon various processing or storage resources of a single node increase beyond the capacity of the node to perform according to a desired standard, an additional node may take over some of the workload from the original node so that the performance standard may be maintained. Given that scale out techniques may be widely applicable, improvements to the performance of such techniques are desirable.

BRIEF DESCRIPTION OF THE DRAWINGS

FIG. 2A is a high-level flowchart illustrating a re-sharding operation that includes determining a number of shards to be split based on the Fibonacci sequence, according to some embodiments.

FIG. 2B illustrates an example use of the Fibonacci sequence to determine a number of shards to be split, according to some embodiments.

FIG. 2C illustrates an example ordering of shards based on loads of corresponding nodes, according to some embodiments.

FIG. 2D illustrates a sub-set of an ordered set of shards being selected to be split based on loads of corresponding nodes, according to some embodiments.

FIG. 2E illustrates respective loads of nodes that correspond to a set of shards subsequent to a re-sharding operation, according to some embodiments.

FIG. 2F illustrates an example, algorithm for performing a re-sharding operation, according to some embodiments.

Figure 1A:
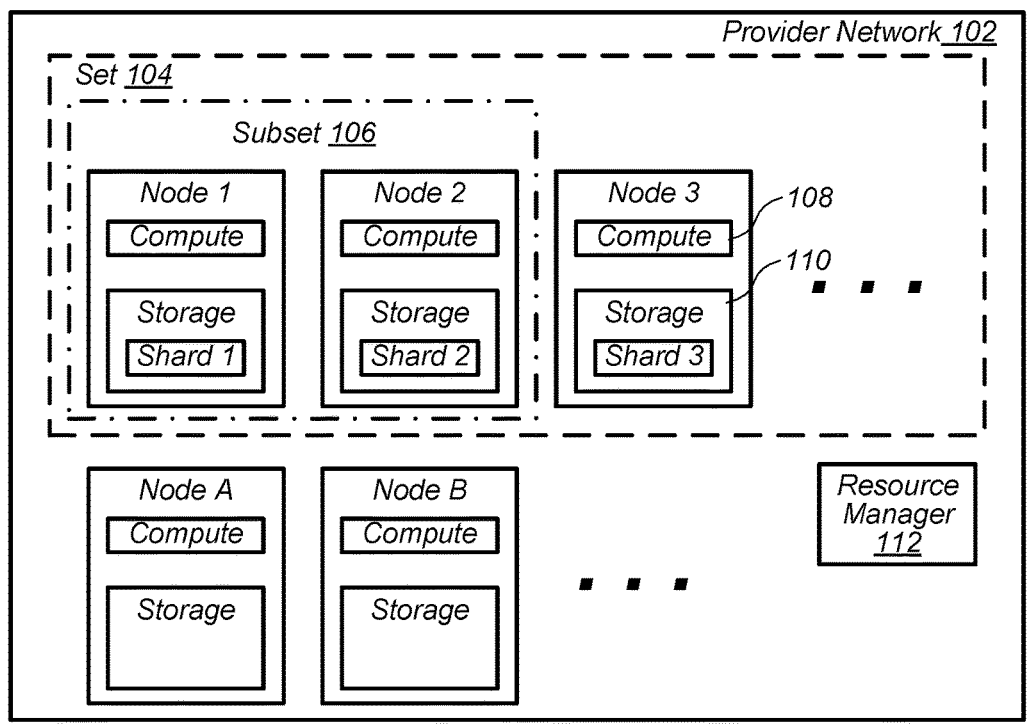
FIGS. 1A-1C are a series of logical block diagrams illustrating a re-sharding operation that includes splitting a subset of a set of shards and moving second portions of the split shards to additional nodes, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to perform a re-sharding operation for a set of shards without performing a re-balancing of data across the full set of shards, according to some embodiments. In one embodiment, a set of nodes are responsible for storing, processing, managing, or otherwise providing access to data of a corresponding set of shards. In one embodiment, requests to access data of one or more of the shards, such as requests to read data from or write data to a given shard, may be handled by a given node that stores the data of the given shard and is designated or otherwise assigned to process requests for the given shard. When this node or one or more additional nodes become unable to meet a desired performance standard (or are proactively or preemptively selected for re-sharding), a sub-set of the set of shards may be split in order to effect a split in storage and processing responsibility for a sub-set of the nodes that store the data of the sub-set of shards and/or are designated to or otherwise assigned to process requests for the shards of the sub-set of shards. This may include, in one embodiment, assigning one or more additional nodes to store data and process access requests for a corresponding one or more second portions of the shards of the sub-set that are split.

In some embodiments, a re-sharding operation may include selecting a sub-set of shards to be split based on one or more loads associated with the shards or one or more loads of the nodes in which the shards are stored. For example, in some embodiments shards may be selected to be included in a sub-set of shards to be split based, at least in part, on a rate at which data is being stored for a given shard, a rate at which data is being read from a given shard, a remaining storage capacity of a node hosting a given shard, a processor usage amount of a node hosting a given shard, a network usage rate associated with a node hosting a given shard, an I/O volume for a node hosting a given shard, or an overall network usage related to one or more nodes hosting one or more shards. In some embodiments, various combinations of the criteria listed above may be used to select a sub-set of shards to be split. In some embodiments, a load on a shard or a node may mean consumption of any resource of the node, shard, or system that is limited or in a resource contention situation with one or more other nodes or other systems. Also, in some embodiments, other suitable load metrics may be used to select a sub-set of shards to be split.

In some embodiments, a number of shards to be included in a sub-set of shards to be split may be determined based, at least in part on, an overall number of shards in the set of shards, and a number selected from the Fibonacci sequence that is the largest number in the Fibonacci sequence less than the overall number of shards in the set. For example, a set of shards may include an overall number of shards equal to 19 shards. Also, the Fibonacci sequence is 0, 1, 1, 2, 3, 5, 8, 13, 21, 34, . . . $F_n$, wherein $F_n = F_{n-1} + F_{n-2}$. Thus, the largest number in the Fibonacci sequence that is less than the overall number of shards (e.g. 19) is 13. Therefore for example, for a set of shards that includes 19 shards, only 13 of the shards may be included in a sub-set of the shards to be split. Furthermore, in some embodiments, the shards of the set (e.g. the 19 shards) may be ordered based on respective loads of the nodes that host the shards and only the shards corresponding to the most highly loaded nodes (e.g. the 13 most loaded shards) may be included in the sub-set of shards to be split.

In some embodiments, re-sharding operations may be performed multiple times as loads of nodes that host respective shards change. Because, the most loaded shards are selected to be split in a re-sharding operation, in subsequent re-sharding operations other nodes not selected to be split in a previous re-sharding operation may be selected to be split as the most loaded shards in the subsequent re-sharding operations. Thus, over multiple iterations of a re-sharding operation being performed for a set of shards, respective loads of the nodes that host the shards may be balanced. This is because a most loaded shard that is split in one iteration may be a less loaded shard that is not split in a subsequent iteration. Also, re-balancing of data across all the shards of the set of shard may be avoided by only causing second portions of the shards of the sub-set of shards that are selected to be split to be moved to other nodes. For example, other re-sharding techniques may redistribute data from a full set of shards across an expanded number of nodes when one or more nodes are added to a set of nodes supporting the shards. This approach may include considerable overhead costs to redistribute data across all of the nodes of the expanded set of nodes. This approach may also result in the data of the set of shards being inaccessible for read and write operations for a period of time while the data of the set of shards is being re-distributed across the set of shards. However, the technique as described above wherein a subset of a set of shards is selected to be split and only second portions of the shards of the sub-set are caused to be moved to additional nodes may avoid at least some of the overhead costs as were incurred in previous techniques.

In some embodiments, a system includes a resource manager that is configured to cause only each shard of a sub-set of shards of data stored within a first set of computing nodes to be split into a first portion and a second portion and cause only the second portions of the first and second portions to be stored on a second set of computing nodes.

In some embodiments, a method includes causing only each shard of a sub-set of shards of data stored within a first set of computing nodes to be split into a first portion and a second portion and causing only the second portions of the first and second portions to be stored on a second set of computing nodes.

In some embodiments, a non-transitory, computer-readable storage medium, stores program instructions that when executed by one or more computing devices cause the one or more computing devices to: cause only each shard of a sub-set of shards of data stored within a first set of computing nodes to be split into a first portion and a second portion; and cause only the second portions of the first and second portions to be stored on a second set of computing nodes.

Figure 1B:
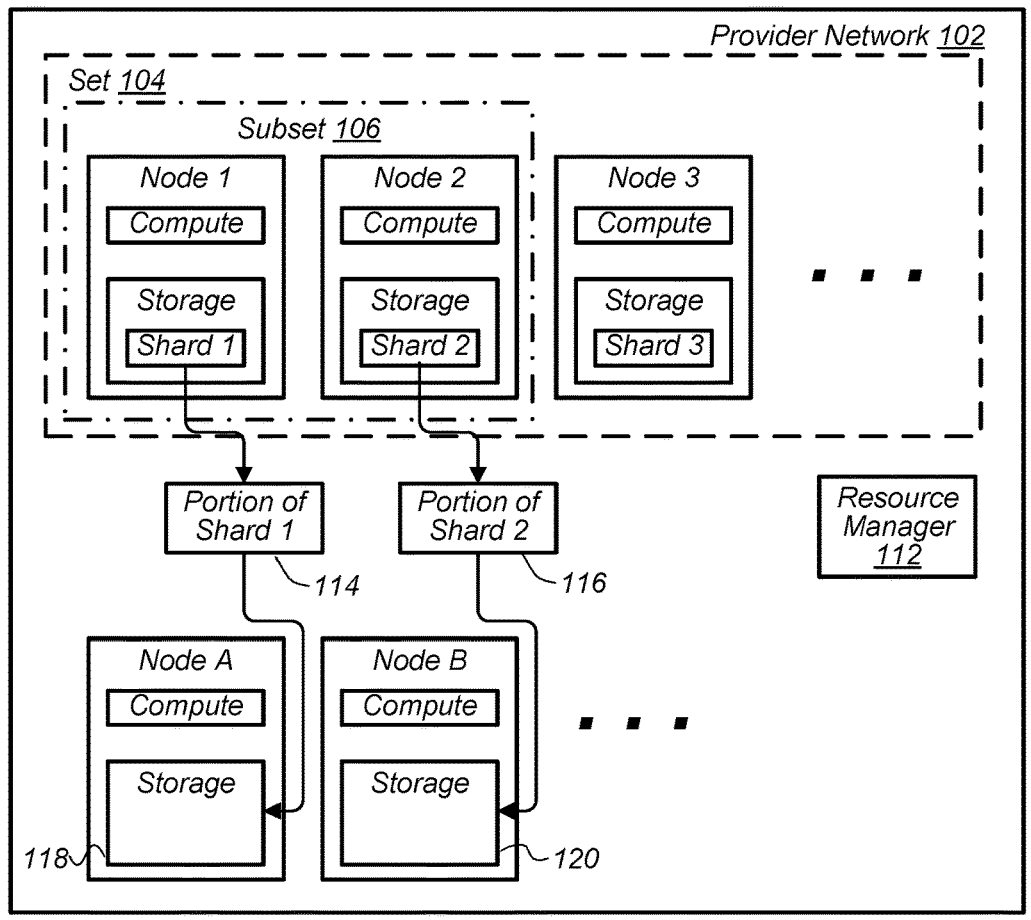
Figure 1C:
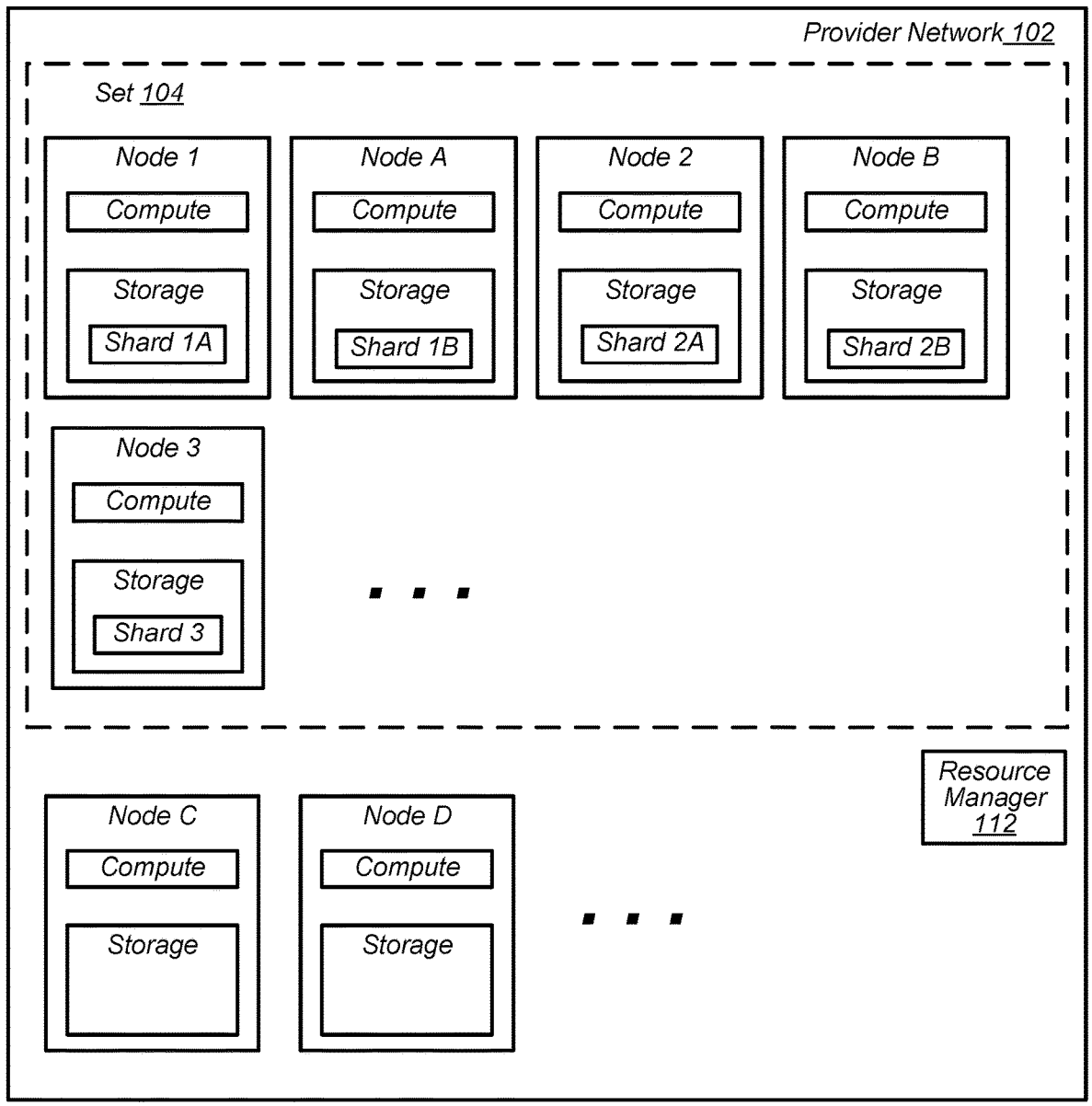

FIGS. 1A-1C are a series of logical block diagrams illustrating splitting a subset of a set of shards and moving second portions of the split shards to additional nodes, according to some embodiments.

Provider network 102 includes nodes 1, 2, and 3 that are included in set 104. Each of nodes 1, 2, and 3, stores a respective shard, for example shards 1, 2, and 3. Nodes 1, 2, and 3, also include processing capacity, for example compute portions 108, and memory, such as storage portions 110. In some embodiments, each of nodes 1, 2, and 3 may be separate computing devices, such as separate servers. In some embodiments, nodes 1, 2, and 3 may be virtual nodes comprising shared computing and storage resources allocated to a customer as a virtual machine. In some embodiments, a set of shards implemented on a set of nodes may include data portions of a common dataset. For example, a database may include data partitioned into multiple shards that are stored on multiple nodes. In some embodiments, data included in shards, such as shards, 1, 2, and 3, may be non-relational data of a non-relational database, such as a NoSQL system. Note, that set 104 is illustrated as comprising three shards each stored in a separate node, however in some embodiments a set of shards, such as set 104 may include any number of shards stored on any number of nodes. In some embodiments, a single node may store more than one shard.

In some embodiments, additional data may be stored for shards of a set, such as shards 1, 2, and 3 of dataset 104. Also, additional loads such as I/O loads, may increase for shards of a dataset, such as shards 1, 2, and 3 of dataset 104. Additionally networking loads associated with servicing shards of a dataset, such as shards 1, 2, and 3 of dataset 104, may increase over time. Due to changing load conditions, one or more nodes of a set of nodes, such as nodes 1, 2, or 3, that host shards of a dataset may become unable to meet a desired performance standard for servicing the shards of the dataset, such as shards 1, 2, or 3 of dataset 104. For example, an amount of data included in a particular shard may approach a capacity of a particular node to store data or a volume of I/O requests for a particular shard may approach a capacity of a node to respond to I/O requests. In some embodiments, in order to meet the desired performance standard, a sub-set of the set of shards may be selected to be split and the shards included in the sub-set may be split into first portions and second portions to reduce the loads of the nodes that host the shards of the sub-set. For example, FIG. 1A illustrates subset 106 of set 104 being selected to be split. Subset 106 includes shards 1 and 2, but does not include shard 3.

In some embodiments, one or more additional nodes may be included in a provider network and may receive a split second portion of a shard of a sub-set. For example, provider network 102 includes nodes A and B that are additional nodes to nodes 1, 2, and 3. In some embodiments, additional nodes, such as nodes A and B may be added as demand for provider network services increases. For example, nodes A and B may be added in order to provide additional capacity for dataset 104. In some embodiments, additional nodes, such as nodes A and B, may be existing nodes in a provider network that have sufficient capacity to accept a portion of a shard. In some embodiments, nodes A and B may be nodes that previously hosted other shards but are no longer being used to host other shards, such that the nodes are available to receive a portion of a shard.

In some embodiments, a resource manager, such as resource manager 112, may cause the sub-set of shards to be selected, for example subset 106. The resource manager may further cause only second portions of the shards of the sub-set to be split from first portions of the shards of the subset. The resource manager may further cause only the second portions to be stored on one or more additional computing nodes. For example, resource manager 112 causes portion 114 of shard 1 and portion 116 of shard 2 to be stored in storage 118 of node A and storage 120 of node B, respectively. Thus the loads of nodes 1 and 2 are reduced by splitting shard 1 and shard 2 into respective first and second portions and causing the respective second portions to be stored in nodes A and B.

As part of splitting one or more shards of a subset of shards of a dataset and causing respective second portions of the spit shards to be stored in additional nodes, an overall number of shards of the dataset and an overall number of nodes hosting the shards may increase. For example, in FIG. 1A dataset 104 included shards 1, 2, and 3 (e.g. three shards) hosted on nodes 1, 2, and 3 (e.g. three nodes). And, as shown in FIG. 1C, subsequent to splitting a portion of the shards of the dataset, dataset 104 includes shards 1A, 1B, 2A, 2B, and 3 (e.g. five shards) hosted on nodes 1, A, 2, B, and 3 (e.g. five nodes). In some embodiments, each node may have an equivalent capacity, thus in some embodiments performing a split operation may increase a capacity of the set of nodes that host the shards of the dataset. Also, because only a sub-set of shards are split, and respective second portions are caused to be stored in additional nodes, a rebalancing of the data of the set of shards across the full number of nodes may not be necessary to be performed. For example, shard 3 stored on node 3 may not be altered by the re-sharding operation (e.g. shard 3 may not be split and moved from node 3). Also, it should be pointed out that the data associated with shard 1A and shard 2B may remain on nodes 1 and 2 after performing the re-sharding operation and may not be redistributed amongst the set of shards.

In some embodiments, additional nodes may further be added to a provider network or may be made available in a provider network for use in subsequent re-sharding operations. For example, FIG. 1C illustrates additional nodes C and D.

FIG. 2A is a high-level flowchart illustrating a re-sharding operation that includes determining a number of shards to be split based on the Fibonacci sequence, according to some embodiments. At 202 an overall number of shards included in a set of shards for which a re-sharding operation is being performed is determined. For example, resource manager 112 may determine that set 104 includes three shards (e.g. shards 1, 2, and 3). At 204, a number of shards to include in a sub-set of shards to be split is determined based on the overall number of shards in the set of shards. In some embodiments, a number of shards to be included in a sub-set of shards to be split may further be determined based on a Fibonacci sequence. For example, in some embodiments, a number of shards included in a subset of shards to be split may be the largest number in a Fibonacci sequence that is less than the overall number of shards in the set of shard for which the re-sharding operation is being performed. For example, FIG. 2B illustrates an example use of the Fibonacci sequence to determine a number of shards to be split, according to some embodiments. In FIG. 2B, the largest number in the Fibonacci sequence (K) that is less than the overall number (N) of shards in the set of shards for which the re-sharding operation is being performed is determined to be two. This is because the overall number of shards determined at 202 is three and the next lower number from three in the Fibonacci sequence is two. In some embodiments, a resource manager may determine an optimal ratio of shards to be split to overall shards that varies from a (K) number of shards that would be determined based on the Fibonacci sequence. For example, the Fibonacci sequence generally will result in a ratio of shards to be split to overall shards that corresponds to the "golden ratio" of the Fibonacci sequence. For example, any two adjacent numbers in the Fibonacci sequence may have a ratio approximately equal to 0.618, e.g. the golden ratio. Thus, when the largest number in the Fibonacci sequence that is less than the overall number of shards in the set of shards is selected as the (K) number of shards to be split, the overall number of shards in the set will grow by the golden ratio, e.g. approximately 61%. However, in some embodiments, a resource manager may determine that another growth rate of the overall number of shards that is greater than or less than the golden ratio is an optimal growth rate. In such embodiments, the (K) number of shards to be split may be determined based on the determined optimal growth rate in addition to or in lieu of being determined based on the Fibonacci sequence. In some embodiments, a correction factor may be used to adjust a number of shards to be split determined based on the Fibonacci sequence to further optimize the system.

At 206, the shards of the set of shards for which the re-sharding operation is being performed are ordered based on one or more load criteria. For example, FIG. 2C illustrates an example ordering of shards based on loads of corresponding nodes, according to some embodiments. In FIG. 2C shards 1, 2, and 3 are ordered in a descending order based on load, where shard 2 has a load of 90%, shard 1 has a load of 80%, and shard 3 has a load of 50%. Note that these loads are given as examples. In some embodiments shards included is a set of shard for which a re-sharding operation is being performed may have various other loads.

At 208, the most loaded nodes of the set of shards for which the re-sharding operation is being performed are included in a sub-set of shards to be split, wherein the number of shards included in the sub-set is the number of shards determined at 204, e.g. two shards. Also, at 208, the selected shards included in the subset are split into respective first portions and second portions. For example, FIG. 2D illustrates a sub-set of an ordered set of shards being selected to be split based on loads of corresponding nodes, according to some embodiments. In FIG. 2D, the K most loaded shards or the K shards with associated nodes having the greatest loads are selected to be split. For example, subset 212 includes the two most loaded shards 2 and 1. Furthermore, at 208 the selected sub-set of shards are split into respective first and second portions.

At 210, the respective second portions are caused to be stored on one or more additional nodes. For example, FIG. 2E illustrates respective loads of nodes that correspond to a set of shards subsequent to a re-sharding operation being performed, according to some embodiments. In FIG. 2E, shards 2 and 1 have been split into shards 2 and 2B and shards 1 and 1B. Also, the loads of shards 1 and 2 have been reduced such that shards 1 and 2 have loads less than shard 3 subsequent to the re-sharding operation being performed.

In some embodiments, a re-sharding operation may be performed multiple times for a set of shards. Over multiple iterations of performing a re-sharding operation loads associated with respective shards of a set of shards for which the re-sharding operation is being iteratively performed may be balanced due to the most loaded nodes being selected to be split during each iteration. For example, in a subsequent re-sharding operation shard 3, which was not split in the previous re-sharding operation as described above, may be selected to be split. For example, in FIG. 2E, subsequent to performing the re-sharding operation, shard 3 has a load of 50%, which is greater than the next most loaded shards, shards 2 and 2B, which both have loads of 45%.

In some embodiments, splitting shards of a sub-set of shards of a set of shards for which a re-sharding operation is being performed may be performed in parallel. For example, in some embodiments, a resource manager, such as resource manager 112, may cause multiple shards to be split at the same time or during overlapping times. For example, shard 1 stored within node 1 may be split at the same time or during an overlapping time as shard 2 stored in node 2 is being split. Performing splitting of shards in parallel may further increase performance of a data system by reducing an amount of time required to perform a re-sharding operation.

FIG. 2F illustrates an example, algorithm for performing a re-sharding operation, according to some embodiments. For example, algorithm 250 may be used to perform a re-sharding operation as described in FIGS. 1A-C and FIGS. 2A-E. In some embodiments, other algorithms may be used to perform a re-sharding operation as described herein.

Figure 3:
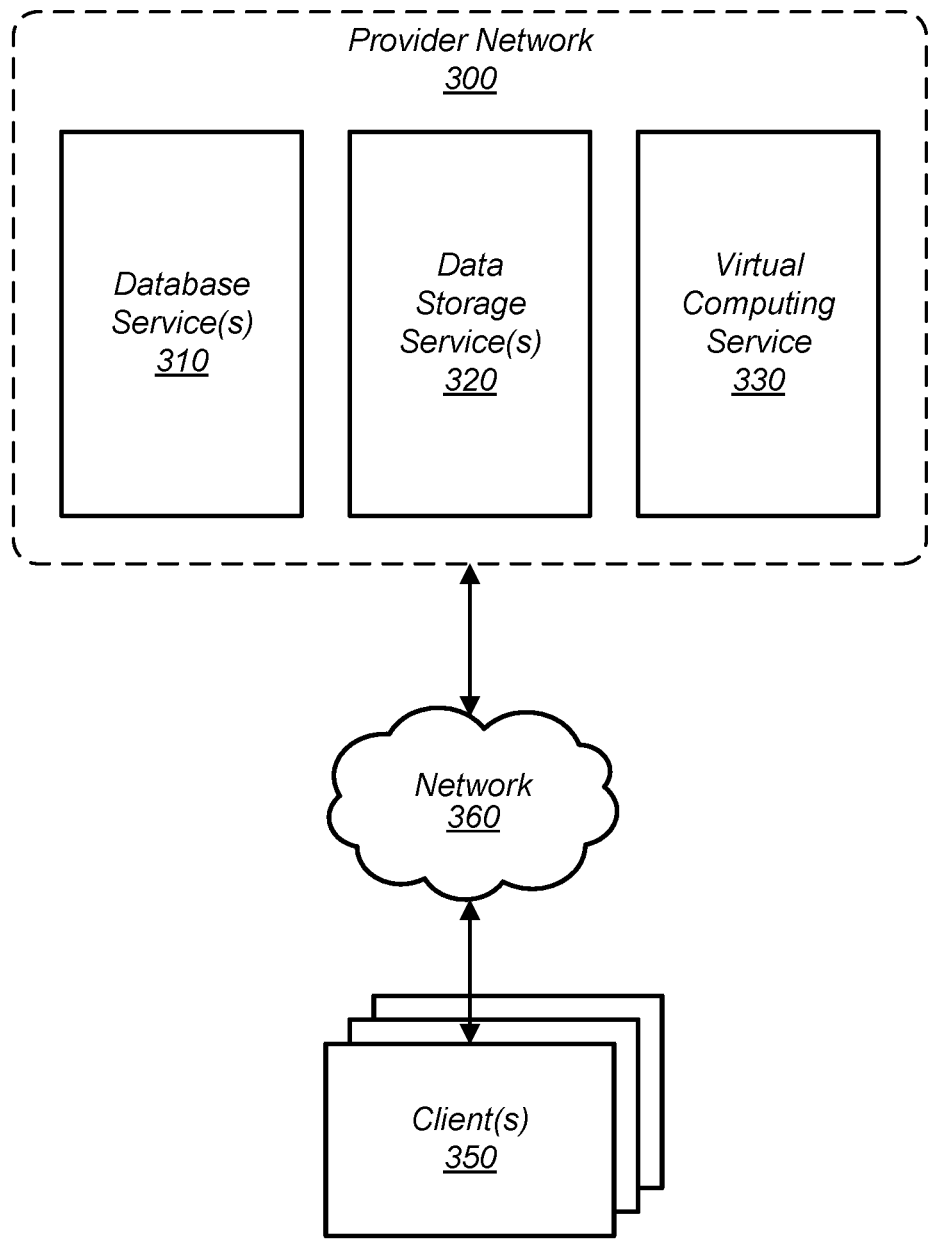
FIG. 3 is a logical block diagram illustrating a provider network implementing different network-based services that may be implemented using a set of shards, according to some embodiments.

FIG. 3 is a logical block diagram illustrating a provider network offering a data storage service serving as a centralized data store for multiple data processing services, according to some embodiments. Provider network 300 may be a private or closed system, in one embodiment, or may be set up by an entity such as a company or a public sector organization to provide one or more services (such as various types of cloud-based storage) accessible via the Internet and/or other networks to clients 350, in another embodiment. In one embodiment, provider network 300 may be implemented in a single location or may include numerous data centers hosting various resource pools, such as collections of physical and/or virtualized computer servers, storage devices, networking equipment and the like (e.g., computing system 700 described below with regard to FIG. 7), needed to implement and distribute the infrastructure and storage services offered by the provider network 300. In one embodiment, provider network 300 may implement various computing resources or services, such as database service(s) 310 or other data processing (e.g., relational or non-relational (NoSQL) database query engines, map reduce processing, data warehouse, data flow processing, and/or other large scale data processing techniques), data storage service 320 (e.g., an object storage service, block-based storage service, or data storage service that may store different types of data for centralized access), and virtual compute service 330, and/or any other type of network based services (which may include various other types of storage, processing, analysis, communication, event handling, visualization, and security services not illustrated).

In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a system that includes a number of computing nodes (or simply, nodes), in one embodiment, each of which may be similar to the computer system embodiment illustrated in FIG. 7 and described below. In one embodiment, the functionality of a given system or service component (e.g., a component of database service(s) 310) may be implemented by a particular node or may be distributed across several nodes. In some embodiments, a given node may implement the functionality of more than one service system component (e.g., more than one data store component). The nodes described above in regard to FIGS. 1-2 may be nodes that implement the functionality of one or more of the service system components described in FIG. 3.

Database service(s) 310 may include various types of database services, in one embodiment, (both relational and non-relational) for storing, querying, and updating data. Such services may be enterprise-class database systems that are highly scalable and extensible. In one embodiment, queries may be directed to a database in database service(s) 310 that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service (s) 310 may also be any of various types of data processing services to perform different functions (e.g., query or other processing engines to perform functions such as anomaly detection, machine learning, data lookup, or any other type of data processing operation). For example, in at least one embodiment, database service(s) 310 may include a map reduce service that creates clusters of processing nodes that implement map reduce functionality over data stored in one of data storage services 320.

Data storage service(s) 320 may implement different types of data stores for storing, accessing, and managing data on behalf of clients 350 as a network-based service that enables clients 350 to operate a data storage system in a cloud or network computing environment, in one embodiment. Data storage service(s) 320 may store data sets (e.g., databases) for other services, like database service(s) 310, in one embodiment. For example, one data storage service 320 may be implemented as a centralized data store so that other data services may access data stored in the centralized data store for processing. Data storage service(s) 320 may provide storage and access to various kinds of object or file data stores for putting, updating, and getting various types, sizes, or collections of data objects or files, in some embodiment. Such data storage service(s) 320 may be accessed via programmatic interfaces (e.g., APIs) or graphical user interfaces, in one embodiment. In one embodiment, data storage service(s) 320 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

Virtual computing service 330 may provide client(s) 350 with access to computing resources, in one embodiment, which may be referred to as virtual compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of the virtual computing service 330 in different embodiments, including general purpose or special purpose computer servers, storage devices, network devices and the like. In one embodiment client(s) 350 or user may be provided direct access to a compute instance, e.g., by giving a user an administrator login and password. Compute instances may operate or implement a variety of different platforms, in one embodiment, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 350 applications, without for example requiring the client 350 to access an instance.

Compute instances may be many different types or configurations based on several different dimensions in one embodiment. Compute instances, in one embodiment, may be classified based in part on the timing or duration of instance allocations—i.e., on when instances are obtained by clients and when they are released by the clients, such as reserved instances, on-demand instances and spot-instances. In one embodiment, reserved compute instances may be reserved for fairly long periods, such as a one-year term or a three-year term, by paying a low, one-time, upfront payment for the instance, and then paying a low hourly rate for actual use of the instance at any desired times during the term of the reservation. Thus, a client 350 that reserved a reserved instance may, by making the long-term reservation, be assured that its reserved instance will be available whenever it is needed.

For those clients 350 that do not wish to make a long-term reservation, the client may instead opt to use on-demand instances (or spot instances), in one embodiment. The pricing policy for on-demand instances may allow the client 350 to pay for resource capacity by the hour with no long-term commitment or upfront payments, in one embodiment. In one embodiment, the client 350 may decrease or increase the resource capacity used, based on application needs, and may only have to pay the hourly rate for the instances used. In some cases the per-hour pricing for on-demand instances may be higher than the hourly rate for reserved compute instances, because the relatively long durations of reservations may provide a more stable revenue stream to the operator of the provider network than the potentially more dynamic revenue stream provided by on-demand instances. Spot instances may provide a third type of resource purchasing and allocation model, in one embodiment. For example, a spot pricing policy may allow a client 350 to specify the maximum hourly price that the client 350 is willing to pay, and the virtual compute service 330 may set a spot price for a given set of available compute resources dynamically based on the prices clients are willing to pay and on the number of instances available to support the spot model. If a client's bid meets or exceeds the current spot price, an instance may be allocated to the client 350. If the spot price rises beyond the bid of the client 350 using a spot instance, access to the instance by the client 350 may be revoked (e.g., the instance may be shut down).

In one embodiment, compute instances have different types or configurations based on expected uptime ratios. The uptime ratio of a particular reserved compute instance may be defined as the ratio of the amount of time the instance is activated, to the total amount of time for which the instance is reserved, in one embodiment. Uptime ratios may also be referred to as utilizations in one embodiment. For example, if a client expects to use a reserved compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If, in another example, the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in one embodiment as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems) in one embodiment. In one embodiment, compute instances may act as consumption resources for data sets purchased via data set marketplace. Size of compute instances, such as a particular number of virtual CPU cores, memory, cache, storage, as well as any other performance characteristic may vary, in one embodiment. Configurations of compute instances may also include their location, in a particular data center, availability zone, geographic, location, etc. . . . and (in the case of reserved compute instances) reservation term length, in one embodiment. The previous descriptions is not intended to be limiting, but merely illustrative of the many different configurations possible for a compute instance provided by virtual computing service 330.

In one embodiment, clients 350 may encompass any type of client configurable to submit network-based requests to provider network 300 via network 360, including requests for database service(s) 310 (e.g., to query a database 310) or data storage service(s) 320 (e.g., a request to create, read, write, obtain, or modify data in data storage service(s) 320, etc.). For example, in one embodiment a given client 350 may include a suitable version of a web browser, or may include a plug-in module or other type of code module configured to execute as an extension to or within an execution environment provided by a web browser. Alternatively in a different embodiment, a client 350 may encompass an application such as a database application (or user interface thereof), a media application, an office application or any other application that may make use of storage resources in data storage service(s) 320 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 350 may be an application configured to interact directly with provider network 300, in one embodiment. In one embodiment, client 350 may be configured to generate network-based services requests according to a Representational State Transfer (REST)-style network-based services architecture, a document- or message-based network-based services architecture, or another suitable network-based services architecture.

In one embodiment, a client 350 may be configured to provide access to provider network 300 to other applications in a manner that is transparent to those applications. For example, client 350 may be configured to integrate with an operating system or file system to provide storage on one of data storage service(s) 320 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 320 may be coordinated by client 350 and the operating system or file system on behalf of applications executing within the operating system environment.

Clients 350 may convey network-based services requests to and receive responses from provider network 300 via network 360, in one embodiment. In one embodiment, network 360 may encompass any suitable combination of networking hardware and protocols necessary to establish network-based communications between clients 350 and provider network 300. For example, network 360 may encompass the various telecommunications networks and service providers that collectively implement the Internet. In one embodiment, network 360 may also include private networks such as local area networks (LANs) or wide area networks (WANs) as well as public or private wireless networks. For example, both a given client 350 and provider network 300 may be respectively provisioned within enterprises having their own internal networks. In such an embodiment, network 360 may include the hardware (e.g., modems, routers, switches, load balancers, proxy servers, etc.) and software (e.g., protocol stacks, accounting software, firewall/security software, etc.) necessary to establish a networking link between given client 350 and the Internet as well as between the Internet and provider network 300. It is noted that in one embodiment, clients 350 may communicate with provider network 300 using a private network rather than the public Internet.

Any of the services described above, such as database service 310, data storage service 320, and/or virtual computing service 330 may be implemented on nodes that store shards of a dataset as described in FIGS. 1-2. Furthermore, a re-sharding operation that increases capacity without performing a re-balancing of data across a full set of shards may be employed to re-shard shards stored in nodes that implement any of the services described above, such as database service 310, data storage service 320, and/or virtual computing service 330. For example, nodes that store shards as described in FIGS. 1-2 may store a portion of a dataset of a data storage service, such as data storage service 320. As another example, nodes that store shards as described in FIGS. 1-2 may also store portions of data of a database, such as a database managed by a database service 310. Also, in some embodiments, nodes such as the nodes described in FIGS. 1-2 may implement a computing service, such as computing service 310. In such embodiments, the nodes may store data in cache memory of the nodes.

Figure 4:
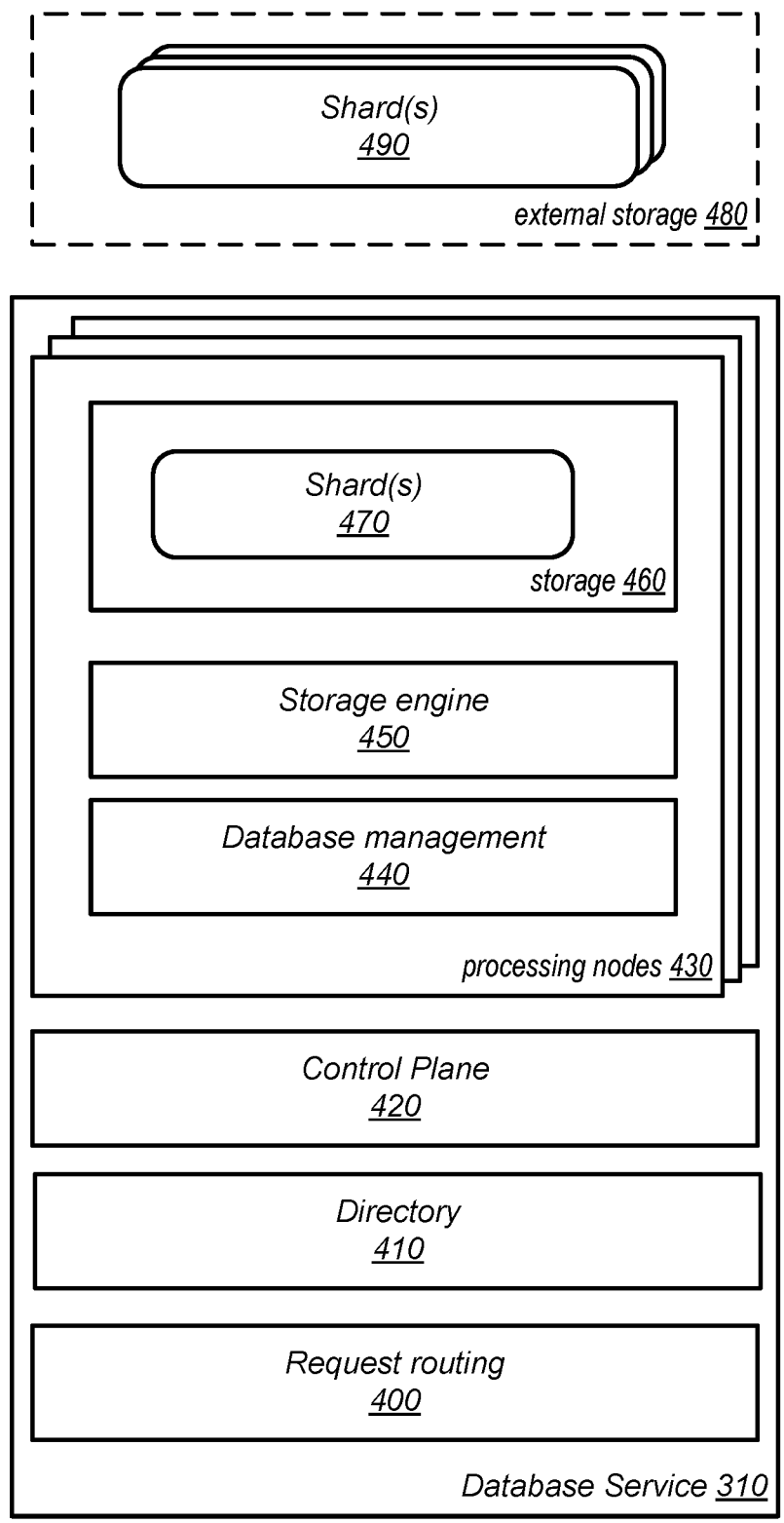
FIG. 4 is a logical block diagram of a database service that may be implemented using a set of shards, according to some embodiments.

FIG. 4 is a logical block diagram of a database service that may perform re-sharding without performing a re-balancing of data across a full set of shards, according to some embodiments. Database service 310 may implement request routing 310, in one embodiment. Request routing may be configured to receive, authenticate, parse, throttle and/or dispatch service requests, among other things, in one embodiment. In one embodiment, database service 310 may implement control plane 420 to implement one or more administrative components, such as automated admin instances which may be configured to provide a variety of visibility and/or control functions, as described in more detail herein). In one embodiment, control plane 420 may function as a resource manager that causes re-sharding operations, as described herein, to be performed. In one embodiment, database service 310 may also implement a plurality of processing nodes 430, each of which may manage one or more shards 370 of a data set (e.g., a database) on behalf of clients/users or on behalf of the data storage service (and its underlying system) which may be stored in storage 460 (on storage devices attached to processing nodes 430) or, in another embodiment, one or more shards 490 in external storage 480 which may be accessed by processing nodes 330 (e.g., via network connections).

Control plane 420 may provide visibility and control to system administrators, detect when one or more threshold criteria for causing a re-sharding operation to be performed have been exceeded, and/or provide anomaly control, or resource allocation, in one embodiment. In one embodiment, control plane 420 may also include an admin console, through which system administrators may interact with the data storage service (and/or the underlying system). In one embodiment, the admin console may be the primary point of visibility and control for the data storage service (e.g., for configuration or reconfiguration by system administrators). In some embodiments, an admin console may provide an option for a re-sharding operation to be performed in response to a user input, such as a request to perform a re-sharding operation. For example, the admin console may be implemented as a relatively thin client that provides display and control functionally to system administrators and/or other privileged users, and through which system status indicators, metadata, and/or operating parameters may be observed and/or updated. Control plane 420 may provide an interface or access to information stored about one or more detected control plane events, such as re-sharding operations to be performed, at storage service 320, in one embodiment.

Control plane 420 may be configured to direct the performance of different types of control plane operations among the nodes, systems, or devices implementing database service 310, in one embodiment. For instance, control plane 420 may be configured to communicate with processing nodes to initiate the performance of various control plane operations, such as moves, splits, update tables, delete tables, create indexes, etc. In one embodiment, control plane 420 may be configured to update a task registry (or some other table or data structure) with the status, state, or performance information of the control plane operations currently being performed.

In one embodiment, request routing 400 may support handling requests formatted according to an interface to support different types of web services requests. For example, in one embodiments, database service 310 may be configured to implement a particular web services application programming interface (API) that supports a variety of operations on tables (or other data objects) that are maintained and managed on behalf of clients/users by the data storage service system (and/or data stored in those tables). In one embodiment, database service 310 may be configured to support different types of web services requests. For example, in one embodiments, database service 310 may be configured to implement a particular web services application programming interface (API) that supports a variety of operations on tables (or other data objects) that are maintained and managed on behalf of clients/users by the data storage service system (and/or data stored in those tables). In one embodiment, request routing 400 may perform parsing and/or throttling of service requests, authentication and/or metering of service requests, dispatching service requests, and/or maintaining a shard assignments that map processing nodes to shards.

In some embodiments, a database service, such as database service 310, may further include a directory, such as directory 410. A directory may store information indicating what data is associated with each shard of a set of shards, such as shards 470 and/or 490. For example, in some embodiments pieces of data may have associated key values and a directory may indicate which key values are associated with different ones of the shards. Also, in some embodiments, a directory may store information indicating storage locations of respective shards. For example, a directory may indicate which shards are stored in which nodes of a multi-node system. In some embodiments, a request routing service, such as request routing 400, may consult a directory, such as directory 410, in response to receiving a read or write request to determine an appropriate shard and/or node to consult to perform the requested read or write operation. Furthermore, in some embodiments, a resource manager or control plane, such as control plane 420, may update a directory, such as directory 410, in response to a re-sharding operation being performed. For example, a directory may be updated to indicate newly added shards, to indicate which pieces of data are associated with different shards, and to indicate storage locations of different shards.

Processing nodes 430 may implement database management 440, in one embodiment. Database management 440 may create, update, define, query, and/or otherwise administer databases, in one embodiment. For instance, database management 440 may maintain a database according to a database model (e.g., a relational or non-relational database model). In one embodiment, database management 440 may allow a client to manage data definitions (e.g., Data Definition Language (DDL) requests to describe column definitions, requests to add item attributes, etc.). In one embodiment, database management 440 may handle requests to access the data (e.g., to insert, modify, add, or delete data as well as requests to query for data by generating query execution plans to determine which shards of a database may need to be evaluated or searched in order to service the query). In one embodiment, database management 440 may also perform other management functions, such as enforcing access controls or permissions, concurrency control, or recovery operations. In one embodiment, database management 440 may send requests to storage engine 450 to access shards in order to process access requests (e.g., requests to read or scan different shards or particular items or parts of data within a shard).

In one embodiment, processing nodes 430 may implement storage engine 450 to access either internal storage 460 and/or external storage 480. Storage engine 450 may perform requests on behalf of database management to create, read, update and delete (CRUD) data in a shard, in one embodiment. Storage engine 450 may implement buffers, caches, or other storage components to reduce the number of times storage is accessed, in one embodiment. After reassignment of a shard from one node or storage engine to another node or storage engine, the storage engine 450 may only have to retain those data pages that are taken from the storage unit maintaining the shard assigned to the storage engine 450, in one embodiment. In this way, storage engine 450 need not maintain data pages that include data from other shards not assigned to the storage engine 450. Storage engine 450 may implement various storage interfaces to access internal storage 460 or external storage 480. For example, in those embodiments where external storage is a network-based data storage service, like data storage service 320 in FIG. 3, then storage engine 450 may be configured to establish a network connection with external storage 480 as part of obtaining access to a storage unit (e.g., by submit requests formatted according to a protocol or API to establish the connection). In another embodiment, storage engine 450 may access internal storage 460 using storage protocols (e.g., Small Computer Systems Interface (SCSI)) over a bus or other interconnect that directly connects a host implementing storage engine 450 with internal storage 460).

In one embodiment, database service 310 may provide functionality for creating, accessing, and/or managing tables processed at nodes within a single-tenant environment that provide functionality for creating, accessing, and/or managing tables maintained in nodes within a multi-tenant environment. In another embodiment, functionality to support both multi-tenant and single-tenant environments may be included in any or all of the components illustrated in FIG. 4. Note also that in one embodiment, one or more processing nodes 430 process access requests on behalf of clients directed to tables. Some of these processing nodes may operate as if they were in a multi-tenant environment, and others may operate as if they were in a single-tenant environment. In one embodiments, processing nodes 430 that operate as in a multi-tenant environment may be implemented on different processing nodes (or on different virtual machines executing on a single host) than processing nodes that operate as in a single-tenant environment.

Figure 5:
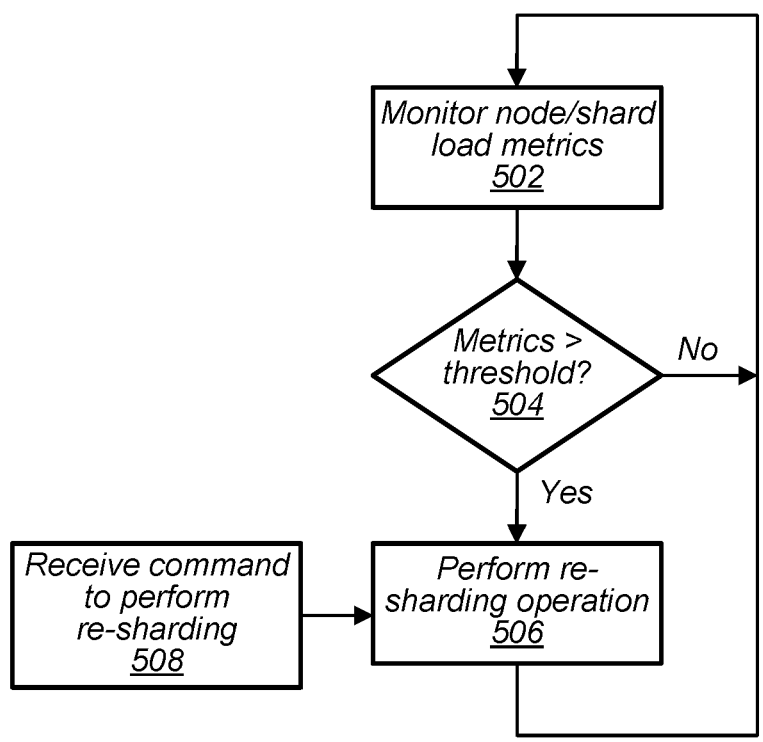
FIG. 5 is a logical block diagram illustrating a process for triggering a re-sharding operation to be performed, according to some embodiments.

FIG. 5 is a logical block diagram illustrating a process for triggering a re-sharding operation to be performed, according to some embodiments. A control plane, such as control plane 420 described in FIG. 4, may monitor load metrics associated with one or more shards, one or more nodes, or a combination thereof. In some embodiments, in response to a load metric exceeding a threshold value a re-sharding operation may be performed for a set of shards of a dataset. In some embodiments, load metrics may include a rate at which data is being stored for a given shard, a rate at which data is being read from a given shard, a remaining storage capacity of a node hosting a given shard, a processor usage amount of a node hosting a given shard, a network usage rate associated with a node hosting a given shard, an I/O volume for a node hosting a given shard, or an overall network usage related to one or more nodes hosting one or more shards. Also in some embodiments, load metrics may include system level metrics such as, a rate at which data is being stored for a set of shards, a rate at which data is being read from a set of shards, a remaining storage capacity of a set of nodes, a processor usage amount of a set of nodes, a network usage rate associated with a set of nodes hosting a set of shards, an I/O volume for a set of nodes hosting a set of shards, or an overall network usage related to one or more nodes hosting one or more shards. In some embodiments, any number of nodes and/or shards may be grouped together in various combinations to determine a load metric. At 502 a load metric for one or more shards, such as any of the load metrics described above is monitored.

At 504 it is determined whether a monitored load metric exceeds a threshold value. If a load metric does not exceed a threshold value the process reverts to 502 and continues to monitor the one or more load metrics. For example, in some embodiments, a load metric may be an amount of storage space remaining on individual nodes. For example a threshold value may be 90% storage capacity used. At 504 in response to determining no nodes of a set of nodes that host a set of shards have storage capacities that are 90% or more consumed, the process may revert to 502. However, if a node of the set of nodes that host the set of shards has a storage capacity used load metric that exceeds 90%, for example 95%, then a re-sharding operation may be triggered. For example, at 506 a re-sharding operation is performed. A re-sharding operation may be performed in a similar manner as described in FIG. 2A. Subsequent to performing a re-sharding operation, a control plane, such as control plane 420, may revert to 502 and continue to monitor load metrics of shards and or nodes that implement one or more services controlled by the control plane.

In some embodiments, a user or administrator may manually trigger a re-sharding operation to be performed in lieu of or in addition to a re-sharding operation being performed in response to one or more load metrics exceeding one or more thresholds. For example, at 508 a command to perform a re-sharding operation is received and in response at 506 a re-sharding operation is performed.

Figure 6:
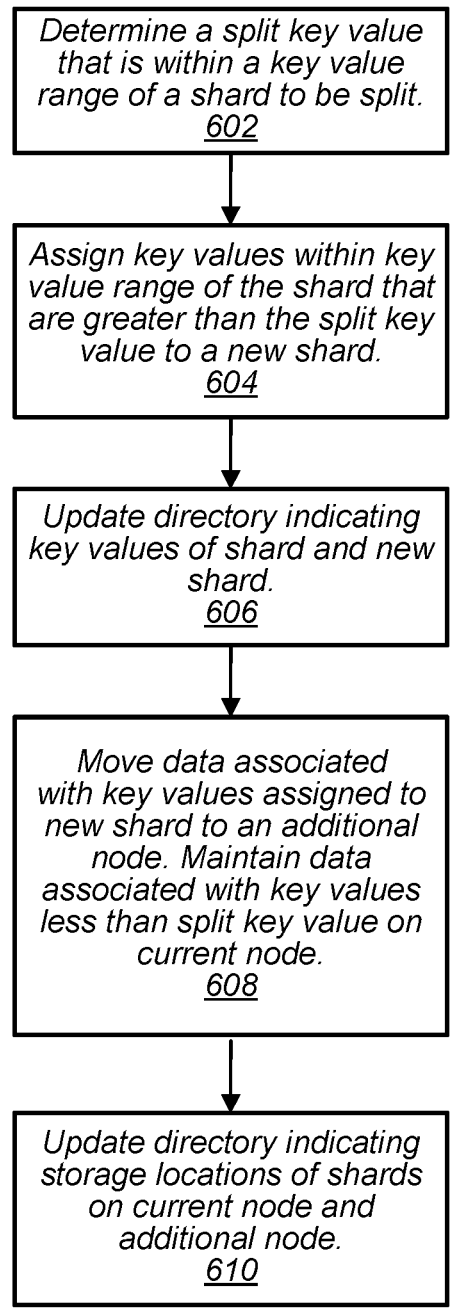
FIG. 6 is a high-level flowchart illustrating various methods and techniques to split a shard, according to some embodiments.

FIG. 6 is a high-level flowchart illustrating various methods and techniques to split a shard, according to some embodiments. Note that FIG. 6 shows an example split operation that performs a local split of a shard. The split is local because it is performed at the shard and a portion of the data currently stored in the node hosting the shard being split remains being stored in the same node after the local split operation is performed. However, in some embodiments, various other split operations may be performed as part of a re-sharding operation.

In some embodiments, once a subset of shards is selected to be split, a local split operation may be performed wherein a first portion of a shard remains stored in a node hosting the shard and a second portion of the shard is caused to be stored in a second node. In order to perform such a split operation, in some embodiments, at 602 a split key value within a key range of a shard that is to be split is determined. For example, a shard may represent data with key values spanning a key value range and a value within the range, for example in some embodiments, a midpoint within the range, may be selected as a split key value. Key values from a bottom key value for the shard up to and/or including the split key value may be considered a first portion of the shard and key values at or greater than the split key value up to a top key value for the shard may be considered a second portion of the shard. At 604, key values that are greater than the split key value, for example the second portion of the shard are assigned to a new shard. For example, as shown in FIG. 1, shard 1 is split into shard 1 and shard 1A. For example, shard 1A may include data having key values greater than a split key value within a key value range for shard 1. At 606, a directory is updated to indicate which key values are associated with which shards. For example, a directory may be updated to indicate that key values previously associated with shard 1 are now associated with shard 1A. At 608, data associated with key values assigned to a new shard resulting from a split operation is moved to a new node. Also, data below a split key value for a shard being split is maintained on a current node hosting the shard. In some embodiments, 606 and 608 may be performed concurrently. Also, in some embodiments 608 may be performed prior to or at the same time as 606. In some embodiments, the split shard portion maintained on the current shard and the split shard portion caused to be stored in an additional node may be reversed. For example, in some embodiments a first portion of a split shard may be moved to an additional node and a second portion of split shard may be maintained on a current node.

At 610, one or more directories is updated to indicate locations (e.g. nodes) at which shards are stored subsequent to performing a split operation. For example, one or more directories may be updated to indicate that a shard created as a result of a split is stored on an additional node. For example, a directory may be updated to indicate that shard 1A is stored on node A. In some embodiments, various other suitable techniques may be used to split a shard into a first portion and a second portion and move the second portion to an additional node while the first portion remains stored within an initial node hosting the shard that is split.

In some embodiments, operations 606, 608, and 610 may be performed at the same time or concurrently. In some embodiments, operations 606, 608, and 610 may appear to a client of a service provided by a provider network to be an atomic operation. For example, to outside clients a view of the shards may appear such that the split of the shards is a single operation. Also, in some embodiments, 606, 608, and 610 may be performed such that concurrent operations, such as read and write requests, are handled while the shard is being split.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 7:
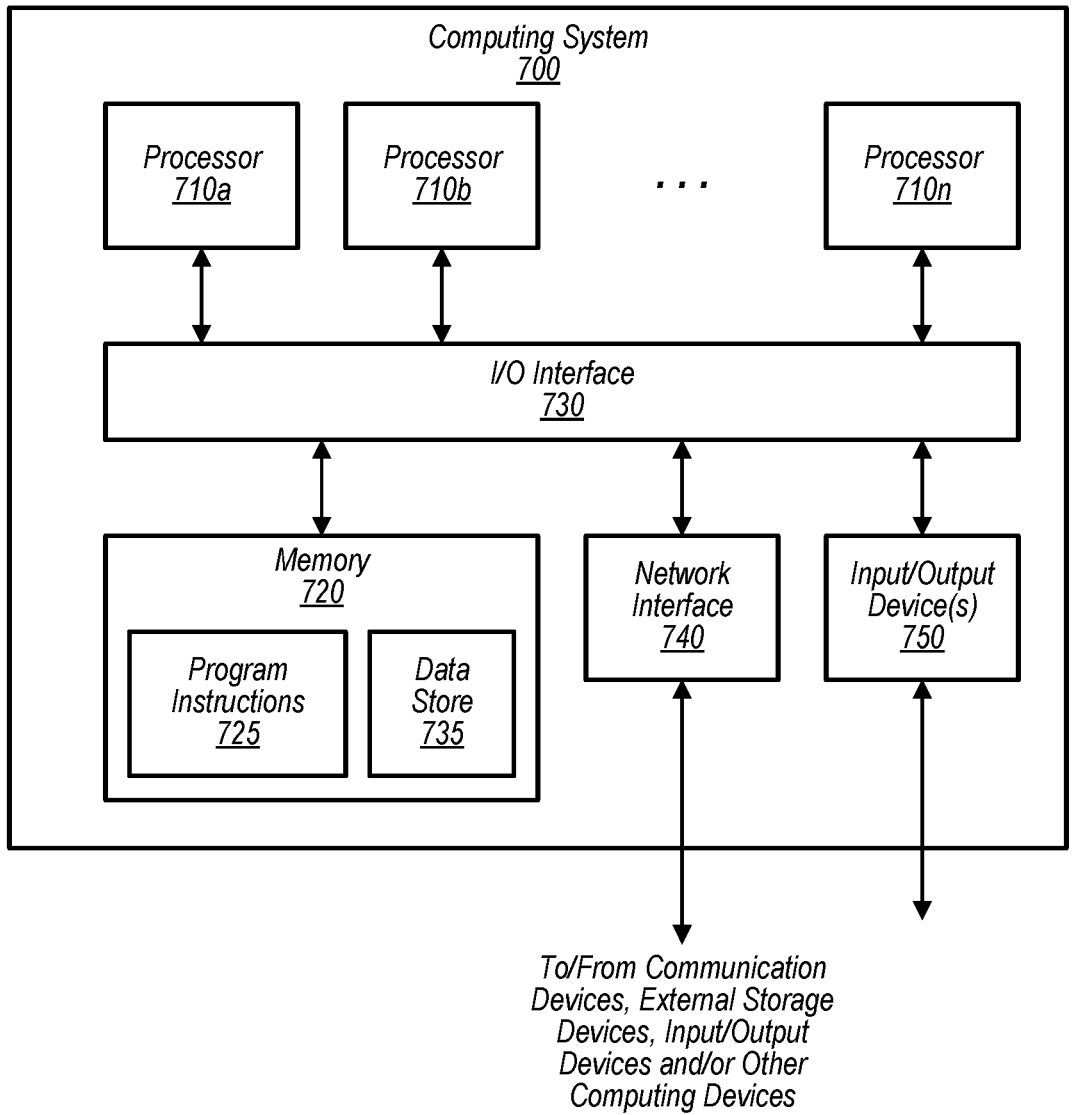
FIG. 7 is a block diagram illustrating an example computing system, according to some embodiments.

Embodiments of performing a re-sharding operation may be executed on one or more computer systems, which may interact with various other devices. One such computer system is illustrated by FIG. 7. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions, in one embodiment. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s), in one embodiment.

System memory 720 may be configured to store program instructions 725 and/or data accessible by processor 710, in one embodiment. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 720 as program instructions 725 and data storage 735, respectively. In other embodiments, program instructions and/or data may be received, sent or stored upon different types of computer-accessible media or on similar media separate from system memory 720 or computer system 700. A computer-accessible medium may include non-transitory storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740, in one embodiment.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700, in one embodiment. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700, in one embodiment. Multiple input/output devices 750 may be present in computer system 700 or may be distributed on various nodes of computer system 700, in one embodiment. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, configured to implement the various embodiments of the systems as described herein, and data store 735, comprising various data accessible by program instructions 725, in one embodiment. In one embodiment, program instructions 725 may include software elements of embodiments as described herein and as illustrated in FIGS. 1-6. Data storage 735 may include data that may be used in embodiments. In other embodiments, other or different software elements and data may be included.

Those skilled in the art will appreciate that computer system 700 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 700 may be transmitted to computer system 700 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more computer systems comprising computer hardware configured to implement a resource manager to:
cause a set of shards of a common dataset to be stored in storages of a first set of computing nodes;
determine a number of new shards to add for the common dataset, wherein the number is determined based on a current number of shards in the set and is less than the current number; and
create the determined number of new shards for the common dataset, wherein create the determined number of new shards for the common dataset comprises:
identify an equivalent number of existing shards from the set of shards as a sub-set of shards to split;
cause only each shard of the sub-set of the set of shards stored in the storages of the first set of computing nodes to be split into a first portion and a second portion; and
cause only the second portions of the first and second portions to be stored in storages of a second set of computing nodes.

2. The system of claim 1, wherein the number of new shards to add for the common dataset is determined based at least in part on a largest number in a Fibonacci sequence less than the number of shards in the set, wherein the Fibonacci sequence begins with zero or a positive integer.

3. The system of claim 1, wherein the resource manager causes shards to be included in the sub-set of shards based on respective loads of the computing nodes.

4. The system of claim 1, wherein said split of the shards of the sub-set load balances a set of shards that includes the sub-set without performing a rebalancing operation subsequent to causing only the second portions to be stored in the storages of the second set of computing nodes.

5. The system of claim 1, wherein the sub-set of shards comprise non-relational formatted data.

6. A method, comprising:
causing a set of shards of a common dataset to be stored in storages of a first set of computing nodes;
determining a number of new shards to add for the common dataset, wherein the number is determined based on a current number of shards in the set and is less than the current number; and
creating the determined number of new shards for the common dataset, comprising:
identifying an equivalent number of existing chards from the set of shards as a sub-set of shards to split;
causing only each shard of the sub-set of the set of shards stored in the storages of the first set of computing nodes to be split into a first portion and a second portion; and
causing only the second portions of the first and second portions to be stored in storages of a second set of computing nodes.

7. The method of claim 6,
wherein said determining the number of new shards to add for the common dataset is based on a largest number in a Fibonacci sequence less than the number of shards in the set, wherein the Fibonacci sequence begins with zero or a positive integer.

8. The method of claim 6, further comprising:
performing a split of at least one shard of the sub-set in parallel with performing a split of at least one other shard of the sub-set.

9. The method of claim 6, further comprising:
causing shards to be included in the sub-set based on respective loads of the computing nodes within which the shards are stored.

10. The method of claim 9, wherein the respective loads of the computing nodes are based on a data storage rate, a data read rate, an amount of available memory, or a storage capacity of the respective computing nodes.

11. The method of claim 9, wherein the respective loads of the computing nodes are based on node processor usage or node network usage.

12. The method of claim 6, further comprising:
causing a directory to be updated to indicate storage locations of data associated with the second portions.

13. The method of claim 6, wherein said causing the set of shards stored within the sub-set of the first set of computing nodes to be split is performed:
automatically in response to a load associated with the set of shards that includes the sub-set exceeding a threshold amount; or in response to a command to perform a re-sharding of the set of shards that includes the sub-set.

14. A non-transitory, computer-readable storage medium, storing program instructions that when executed by one or more computing devices cause the one or more computing devices to:
  cause a set of shards of a common dataset to be stored in storages of a first set of computing nodes;
  determine a number of new shards to add for the common dataset, wherein the number is determined based on a current number of shards in the set and is less than the current number; and
  create the determined number of new shards for the common dataset, wherein create the determined number of new shards for the common dataset comprises:
    identify an equivalent number of existing shards from the set of shards as a sub-set of shards to split;
    cause only each shard of the sub-set of shards of the set of shards stored in the storages of the first set of computing nodes to be split into a first portion and a second portion; and
    cause only the second portions of the first and second portions to be stored in storages of a second set of computing nodes.

15. The non-transitory, computer-readable storage medium of claim 14, wherein to determine the number of new shards to add for the common dataset, the program instructions further cause the one or more computing devices to determine the number of shards to add for the common dataset based on a largest number in a Fibonacci sequence less than the number of shards in the set, wherein the Fibonacci sequence begins with zero or a positive integer.

16. The non-transitory, computer-readable storage medium of claim 14, wherein the program instructions further cause the one or more computing devices to:
  cause splitting of at least two shards of the sub-set to be performed in parallel.

17. The non-transitory, computer-readable storage medium of claim 14, wherein the program instructions further cause the one or more computing devices to:
  cause shards to be included in the sub-set based on respective loads of the first set of computing nodes within which the set of shards are stored.

18. The non-transitory, computer-readable storage medium of claim 14, wherein the respective loads of the computing nodes are based on I/O volume or network usage.

19. The non-transitory, computer-readable storage medium of claim 14, wherein the respective loads of the computing nodes are based on, memory capacity, storage capacity, or processor usage of the respective computing nodes.

20. The non-transitory, computer-readable storage medium of claim 14, wherein the program instructions further cause the one or more computing devices to:
  cause a directory to be updated to indicate storage locations of data associated with the second portions.

* * * * *